(12) United States Patent
Jang et al.

(10) Patent No.: US 12,538,101 B2
(45) Date of Patent: Jan. 27, 2026

(54) MULTICAST RULE TRANSFORMATION APPARATUS AND METHOD THEREOF

(71) Applicant: SYSMATE CO., LTD., Daejeon (KR)

(72) Inventors: Huijin Jang, Daejeon (KR); Jaegu Yoo, Daejeon (KR); Junsung Kim, Daejeon (KR); Ganho Choi, Daejeon (KR)

(73) Assignee: SYSMATE CO., LTD., Daejeon (KR)

( * ) Notice: Subject to any disclaimer, the term of this patent is extended or adjusted under 35 U.S.C. 154(b) by 290 days.

(21) Appl. No.: 18/506,487

(22) Filed: Nov. 10, 2023

(65) Prior Publication Data

US 2025/0119710 A1    Apr. 10, 2025

(30) Foreign Application Priority Data

Oct. 6, 2023    (KR) .................. 10-2023-0133170

(51) Int. Cl.
*H04L 12/18* (2006.01)
*H04W 4/06* (2009.01)
*H04W 28/06* (2009.01)
*H04W 28/10* (2009.01)

(52) U.S. Cl.
CPC ............. *H04W 4/06* (2013.01); *H04W 28/06* (2013.01); *H04W 28/10* (2013.01)

(58) Field of Classification Search
None
See application file for complete search history.

(56) References Cited

U.S. PATENT DOCUMENTS

| 7,889,732 | B2 | 2/2011 | Bijwaard et al. |
| 8,437,636 | B2 | 5/2013 | Han et al. |
| 8,737,397 | B2 | 5/2014 | Bijwaard et al. |
| 2007/0147411 | A1 | 6/2007 | Bijwaard et al. |
| 2009/0161674 | A1 | 6/2009 | Bou-Diab et al. |
| 2010/0158523 | A1 | 6/2010 | Han et al. |
| 2011/0122873 | A1 | 5/2011 | Bijwaard et al. |
| 2021/0075633 | A1* | 3/2021 | Sen ................. G06F 12/1081 |

FOREIGN PATENT DOCUMENTS

| KR | 10-2008-0085841 A1 | 9/2008 |
| KR | 10-2010-0073113 A1 | 7/2010 |

* cited by examiner

*Primary Examiner* — Gary Lafontant
(74) *Attorney, Agent, or Firm* — NSIP Law

(57) ABSTRACT

Disclosed are a multicast rule transformation apparatus and a method thereof. The multicast rule transformation apparatus according to an embodiment of the present invention performs an intersection transformation to convert a service flow rule for unicast transmission into a service flow rule for multicast transmission.

13 Claims, 11 Drawing Sheets

MULTICAST RULE TRANSFORMATION APPARATUS AND METHOD THEREOF

CROSS-REFERENCE TO RELATED APPLICATION(S)

This application claims the benefit under 35 USC § 119(a) of Korean Patent Application No. 10-2023-0133170, filed on Oct. 6, 2023, in the Korean Intellectual Property Office, the entire disclosure of which is incorporated herein by reference for all purposes.

BACKGROUND

1. Field

The present invention relates to technology for transforming a unicast service flow rule into a multicast service flow rule.

2. Description of Related Art

Unicast is a one-to-one communication method. A unicast source transmits various data to different user equipment (UE) through network devices. For example, the unicast source transmits five different pieces of data to UE 1, UE 2, UE 3, UE 4, and UE 5, respectively. Unicast communication allows different data to be delivered to different users.

Multicast refers to transmitting the same flow to authorized user equipment. For example, in multicast, the same data is simultaneously transmitted to authorized UE 6, UE 7, and UE 8. Multicast is particularly suitable for scenarios like online video conferencing, online on-demand video, and other applications. In multicast, data can be transmitted to all target nodes at once, or to specific entities (authorized UEs) only.

Network devices operate according to predefined service flow rules to process service flows. Each service flow rule consists of a set of fields, including a matching field that matches headers, an action field that defines processing content, and a statistical information (stats) field.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an embodiment, an apparatus for converting multicast rules and a method thereof are proposed to transform a service flow rule (SF-rule) for unicast transmission into a service flow rule for multicast transmission.

In one general aspect, there is provided a multicast rule transformation apparatus including a rule decoder configured to generate a P4-aware service flow rule (hereinafter referred to as "P4a-Rule") by removing duplications (OR) within a field from a service flow rule for unicast transmission to separate rule entries recognizable in the P4 language, a rule compiler configured to generate a P4-intersect service flow rule (hereinafter referred to as a "P4i-Rule") by separating an overlapping part between the rule entries in the P4a-Rule, which is separated into the rule entries through the rule decoder, using an intersection algorithm, and a rule optimizer configured to generate a P4-optimized service flow rule (hereinafter referred to as "P4o-Rule") by performing optimization to delete invalid rule entries in the P4i-Rule generated by the rule compiler.

The rule compiler may perform a rule-entry intersection operation algorithm on the p4a-Rule according to a type of key field of a service flow rules to calculate an intersection part and may separate the calculated intersection part.

If the type of key field is Subnet Mask field, the rule compiler may calculate the intersection part as a subnet mask with a smaller value among subnet masks being compared, and if the type of key field is Bit Mask field, the rule compiler may calculate the intersection part as a bit mask with the most bits among bit masks being compared.

When calculating the intersection part based on whether the key fields are identical (exact the same fields), the rule compiler may calculate the intersection part as the identical value, and, if the result of the intersection operation is an empty set or an equal set, may determine that the corresponding rule is an invalid rule, and the invalid rule may be subject to removal by the optimizer.

The rule compiler may perform a rule-entry intersection operation algorithm on the P4a-Rule with N rule entries to generate a P4i-Rule with a maximum of $2^N$ rule entries, and the number of rule entries may match the total number of multicast output ports.

The rule compiler may allow for overlap among the rule entries of the P4a-Rule obtained by compiling the R4a-Rule using the intersection algorithm, assign an intersection priority to each rule entry, and assign a higher priority to a rule entry with a larger number of sets included in an intersection.

The rule optimizer may parse the P4i-Rule and remove invalid rule entries from the P4i-Rule to generate the optimized P4o-Rule, the invalid rule entries may be rule entries that satisfy an empty rule condition or an equal rule condition, the empty rule condition may refer to rule entries with no intersection in a matching field, and the equal rule condition may refer to rule entries of the identical matching field.

When the equal rule condition is satisfied, the rule optimizer may delete a rule with fewer output ports (eg-id) among rule entries being compared.

In another general aspect, there is provided a multicast rule transformation method including obtaining a service flow rule for unicast transmission, generating a P4a-Rule by removing duplications (OR) within a field from the obtained service flow rule to separate rule entries recognizable in the P4 language, generating a P4i-Rule by separating an overlapping part between the rule entries in the P4a-Rule, which is separated into the rule entries, using an intersection algorithm, and generating a P4o-Rule by performing optimization to delete invalid rule entries in the generated P4i-Rule.

In the generation of the P4i-Rule, a rule-entry intersection operation algorithm may be performed on the P4a-Rule according to the type of key field of the service flow rule to calculate an intersection part, and the calculated intersection part may be separated.

In the generation of the P4i-Rule, a rule-entry intersection operation algorithm may be performed on the P4a-Rule with N rule entries to generate a P4i-Rule with a maximum of $2^N$ rule entries, and the number of rule entries may match the total number of multicast output ports.

In the generation of the P4i-Rule, overlap among the rule entries of the P4i-Rule obtained by compiling the R4a-Rule using the intersection algorithm may be allowed, an intersection priority may be assigned to each rule entry, and a higher priority may be assigned to a rule entry with a larger number of sets included in an intersection.

In the generation of the P4o-Rule, the P4i-Rule may be parsed and invalid rule entries may be deleted from the P4i-Rule to generate the optimized P4o-Rule, the invalid rule entries may be rule entries that satisfy an empty rule condition or an equal rule condition, the empty rule condition may refer to rule entries with no intersection in a matching field, and the equal rule condition may refer to rule entries of the identical matching field.

Other features and aspects will be apparent from the following detailed description, the drawings, and the claims.

BRIEF DESCRIPTION OF THE DRAWINGS

FIG. 1 is a diagram illustrating the concept of intersection transformation from unicast service flow rules into multicast service flow rules according to an embodiment of the present invention.

FIG. 8 is a table showing the priority among rule entries of P4i-Rule generated by a rule compiler according to an embodiment of the present invention.

Figure 2:
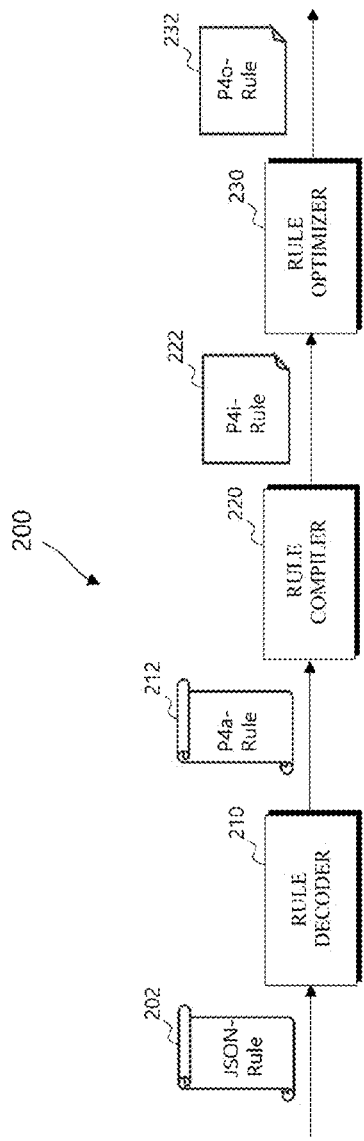
FIG. 2 is a diagram illustrating the configuration of a multicast rule transformation apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The advantages and features of the present invention and the manner of achieving the advantages and features will become apparent with reference to embodiments described in detail below together with the accompanying drawings. However, the present invention may be implemented in many different forms and should not be construed as being limited to the embodiments set forth herein, and the embodiments are provided such that this disclosure will be thorough and complete and will fully convey the scope of the present invention to those skilled in the art, and the present invention is defined only by the scope of the appended claims. The same reference numerals refer to the same components throughout this disclosure.

In the following description of the embodiments of the present invention, if a detailed description of related known functions or configurations is determined to unnecessarily obscure the gist of the present invention, the detailed description thereof will be omitted herein. The terms described below are defined in consideration of the functions in the embodiments of the present invention, and these terms may be varied according to the intent or custom of a user or an operator. Therefore, the definitions of the terms used herein should follow contexts disclosed herein.

Hereinafter, embodiments of the present invention will be described in detail with reference to the accompanying drawings. However, the present invention may be realized in various forms, and the scope of the present invention is not limited to such embodiments. The embodiments of the present invention are provided to aid those skilled in the art in the explanation and the understanding of the present invention.

Figure 1:
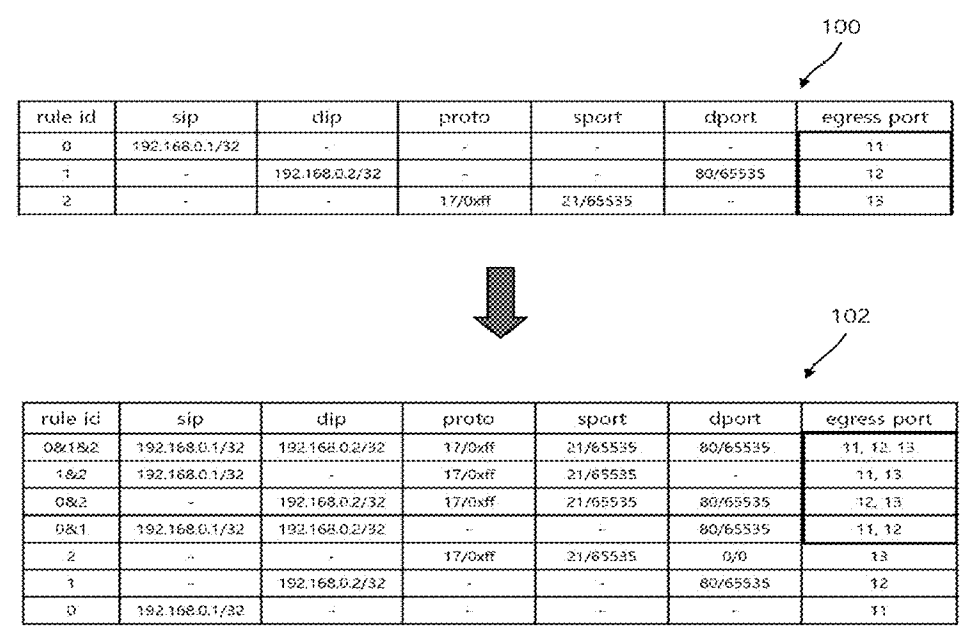

FIG. 1 is a diagram illustrating the concept of intersection transformation from unicast service flow rules into multicast service flow rules according to an embodiment of the present invention.

Referring to FIG. 1, a multicast rule transformation apparatus is an apparatus that performs an intersection transformation to convert unicast service flow rules (SF rule) described by a user into ASIC-based multicast service flow rules for the purpose of multicasting a service flow. The multicast rule transformation apparatus may be a network device such as a router or a switch.

The multicast rule transformation apparatus interprets and processes duplications (OR) within a field and combinations (AND) between fields of a user-described user rule to multicast a specific service flow traffic to multiple ports for each matching condition according to rule matching. The multicast rule transformation apparatus may be used in a P4 language-based programmable bare-metal switch chip. P4 is a programming language for controlling the packet-forwarding plane of a networking device such as a router or a switch. Unlike general-purpose languages such as C or Python, P4 is a domain-specific language with various configurations optimized for network data delivery. P4 may be distributed as open source or permissive license code. A bare-metal switch is a switch device that has physical ports only and can be used by installing software as desired.

The multicast rule transformation apparatus performs an intersection transformation, converting user-described unicast service flow rules 100 into multicast service flow rules 102. In FIG. 1, the unicast service flow rules 102 specify unicast a service flow to each egress port 11, 12, and 13 for each filter entry match. In contrast, the multicast service flow rules (102) are configured to multicast (duplicate) a service flow to egress ports 11, 12, and 13, respectively, for each filter entry match.

FIG. 2 is a diagram illustrating the configuration of a multicast rule transformation apparatus according to an embodiment of the present invention.

Referring to FIG. 2, the multicast rule transformation apparatus 200 includes a rule decoder 210, a rule compiler 220, and a rule optimizer 230.

The rule decoder 210 removes duplications (OR) within the field from the user-defined service flow rule to separate rule entries recognizable in the P4 language. Here, the service flow rule is described by the user based on JSON syntax, allowing for duplications (OR) within the field and combinations (AND) in the field. For example, the rule decoder 210 generates a P4-aware service flow rule (P4-aware SF-Rule, hereinafter referred to as "P4a-Rule") 212 separated into rule entries recognizable in the P4 language by removing duplications (OR) within the field from a JSON-based service flow rule (JSON SF-Rule: hereinafter referred to as "JSON-Rule") 202. P4a-Rule 212 is a rule separated into rule entries by removing duplications (OR) within the field.

The JSON-Rule 202, described by a user, may be in the form of a file and support compatibility with databases (DB), user interface (UI), and backup. For DB compatibility, the JSON-Rule 202 may support compatibility with databases like Maria-DB, Redis-DB (Memory-DB), and backup functionality. For UI compatibility, the JSON-Rule 202 may support REST API compatibility. A user may describe rules based on text that is visually comprehensible.

Subsequently, the rule compiler 220 generates a P4-based intersect service flow rule (P4-intersect SF-Rule: hereinafter referred to as "P4i-Rule") 222 by separating the overlapping part between the rule entries in the P4a-Rule 212, which is separated into the rule entries through the rule decoder 210, using an intersection algorithm. The P4i-Rule 222 is a rule obtained by separating the overlapping part between the rule entries.

Subsequently, the rule optimizer 230 generate a P4-based optimized service flow rule (P4-optimized SF-Rule: hereinafter referred to as "P4o-Rule") 232 by performing optimization to delete invalid rule entries in the P4i-Rule 222.

Figure 3:
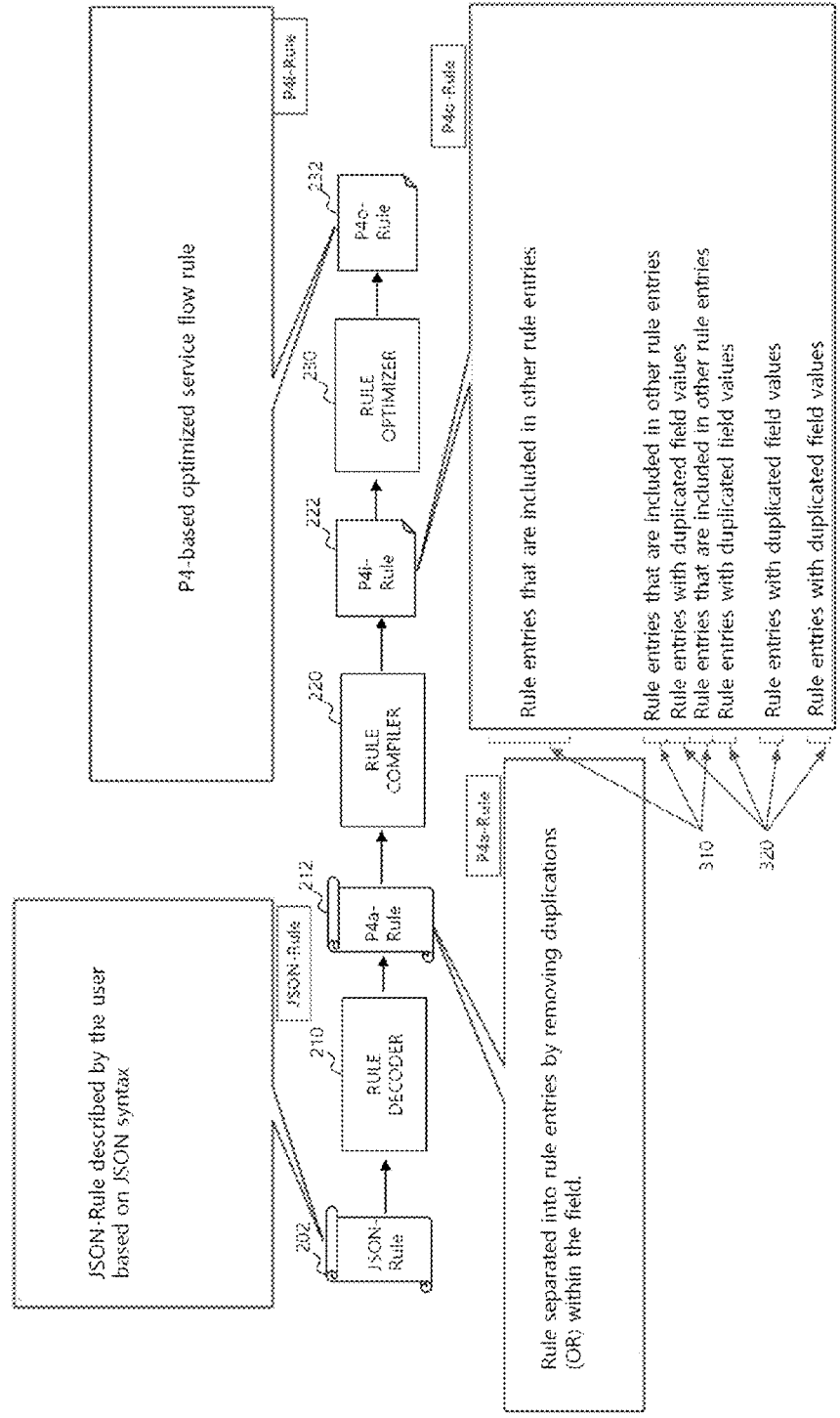
FIG. 3 is a diagram illustrating an example of processing of service flow rule duplication according to an embodiment of the present invention.

FIG. 3 is a diagram illustrating an example of processing of service flow rule duplication according to an embodiment of the present invention.

Referring to FIGS. 2 and 3, a multicast rule transformation apparatus 200 may generate a P4o-Rule 232 by performing optimization through the rule optimizer 230 to remove invalid rule entries in the P4i-Rule 222. In this case, the invalid rule entries may include duplicate rule entries 310 that are included in other rule entries, or rule entries 320 with duplicated field values.

Figure 4:
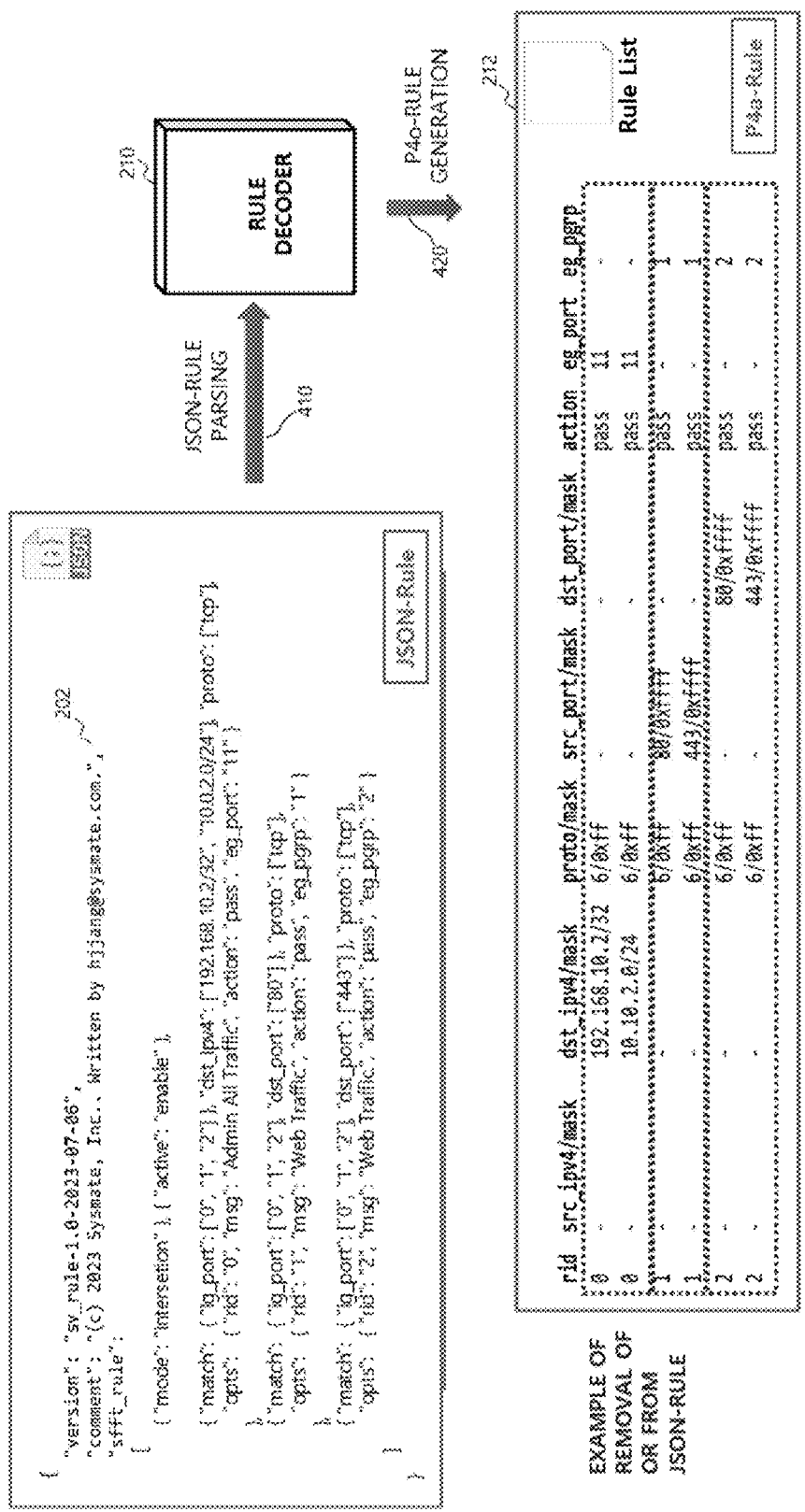
FIG. 4 a diagram illustrating the operation of a rule decoder according to an embodiment of the present invention.

FIG. 4 a diagram illustrating the operation of a rule decoder according to an embodiment of the present invention.

Referring to FIGS. 1 and 4, the rule decoder 210 parses the JSON-Rule 202 described by the user based on JSON syntax (410) and generates P4-aware P4a-Rule 212 by removing duplications (OR) within a field from the JSON-Rule 202 (420).

Figure 5:
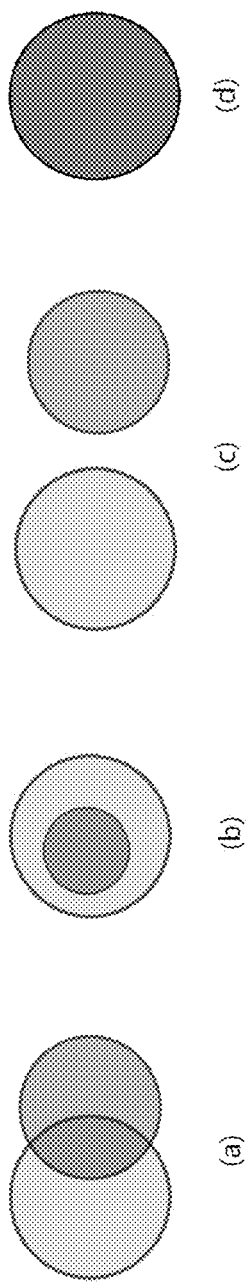
FIG. 5 is a diagram illustrating an intersection operation algorithm of a rule compiler according to an embodiment of the present invention.

FIG. 5 is a diagram illustrating an intersection operation algorithm of a rule compiler according to an embodiment of the present invention.

In FIG. 5, (a) illustrates sets whose overlap is the intersection of rule entries, (b) illustrates sets where the intersection of rule entries is a subset, (c) illustrates sets whose intersection is an empty set where there is no overlap between rule entries, and (d) illustrates equal sets where the rule entries are the same and equal.

Referring to FIG. 2 and FIG. 5, the rule compiler 220 eliminate the overlapping part (intersection) between rule entries in the P4a-Rule 212 with the duplications (OR) within the field removed by the rule decoder 210, to generate the P4i-Rule 222. According to the intersection operation algorithm for removing intersection between rule entries, the rule compiler 220 performs a rule-entry intersection operation algorithm according to the type of key field of the service flow rule to calculate the intersection part, and separates the calculated intersection part.

More specifically, if the type of key field is the Subnet Mask field, the rule compiler 220 calculate the intersection part as the subnet mask with a smaller value among the subnet masks being compared. For example, if the subnet masks being compared are 192.168.0.0/16 and 192.168.0.0/24, the intersection part (192.168.0.0/16∩192.168.0.0/24) is 192.168.0.0/24. If the compared subnet masks are 192.168.0.0/16 and 192.168.1.0/24, the intersection part (192.168.0.0/16∩192.168.1.0/24) is empty.

If the type of key field is the Bit Mask field, the rule compiler 220 calculates the intersection part as the bit mask with the most bits among the bit masks being compared. For example, if the bit masks being compared are 0x2200/0xFF00 and 0x2230/0xFFF0, the intersection part (0x2200/0xFF00∩0x2230/0xFFF0) is 0x2230/0xFFF0. If the bit masks being compared are 0x2000/0xFF00 and 0x2230/0xFFF0, the intersection part (0x2000/0xFF00∩0x2230/0xFFF0) is empty.

When calculating the intersection part based on whether the key fields are identical (exact the same fields), the rule compiler 220 calculates the intersection part as the identical value. For example, if the values being compared are 443 and 443, the intersection part (443∩443) is 443 (equal). In contrast, if the values being compared are 443 and 440, the intersection part (443∩440) is empty. If the result of the intersection operation is an empty set or an equal set, the rule compiler 220 determines that the corresponding rule is an invalid rule. An invalid rule is subject to removal by the optimizer 230.

Figure 6:
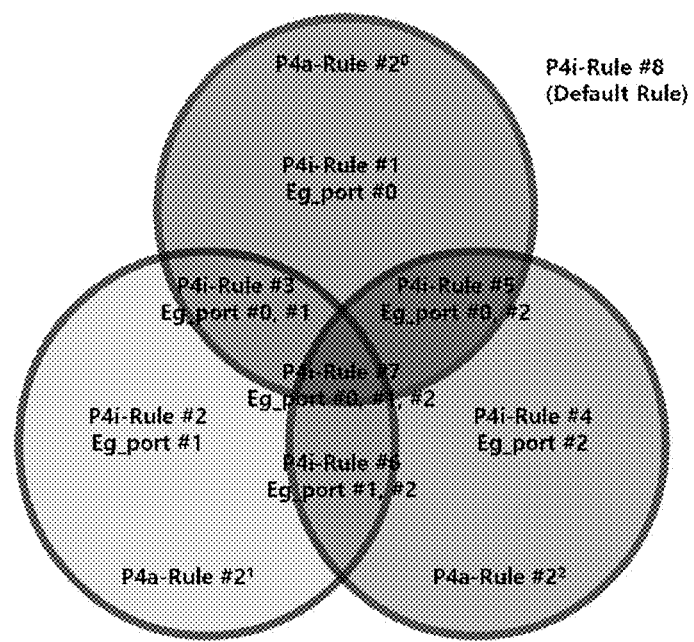
FIG. 6 is a diagram illustrating an example of calculating the number of rule entries of a multicast service flow rule by a rule compiler according to an embodiment of the present invention.

FIG. 6 is a diagram illustrating an example of calculating the number of rule entries of a multicast service flow rule by a rule compiler according to an embodiment of the present invention.

Referring to FIGS. 2 and 6, when the rule compiler 220 applies the intersection algorithm to a P4a-Rule 212 having N rule entries (rid or Rule id based on output ports), it generates a P4i-Rule 222 with a maximum of $2^N$ rule entries. In this case, the number of rule entries matches the total number of multicast output ports. The number N in the P4a-Rule 212 is the number of rids (Rule id) based on output ports.

For example, as shown in FIG. 6, if P4a-Rule Set={P4a-Rule #1, #2, #3}, P4i-Rule Set={P4i-Rule #1, #2, #3, #4, #5, #6, #7, #8}. Here, since the P4a-Rule Set contains three elements, it is confirmed that the P4i-Rule Set has eight ($2^3$=8) elements. P4a-Rule #8 is the default rule.

Figure 7:
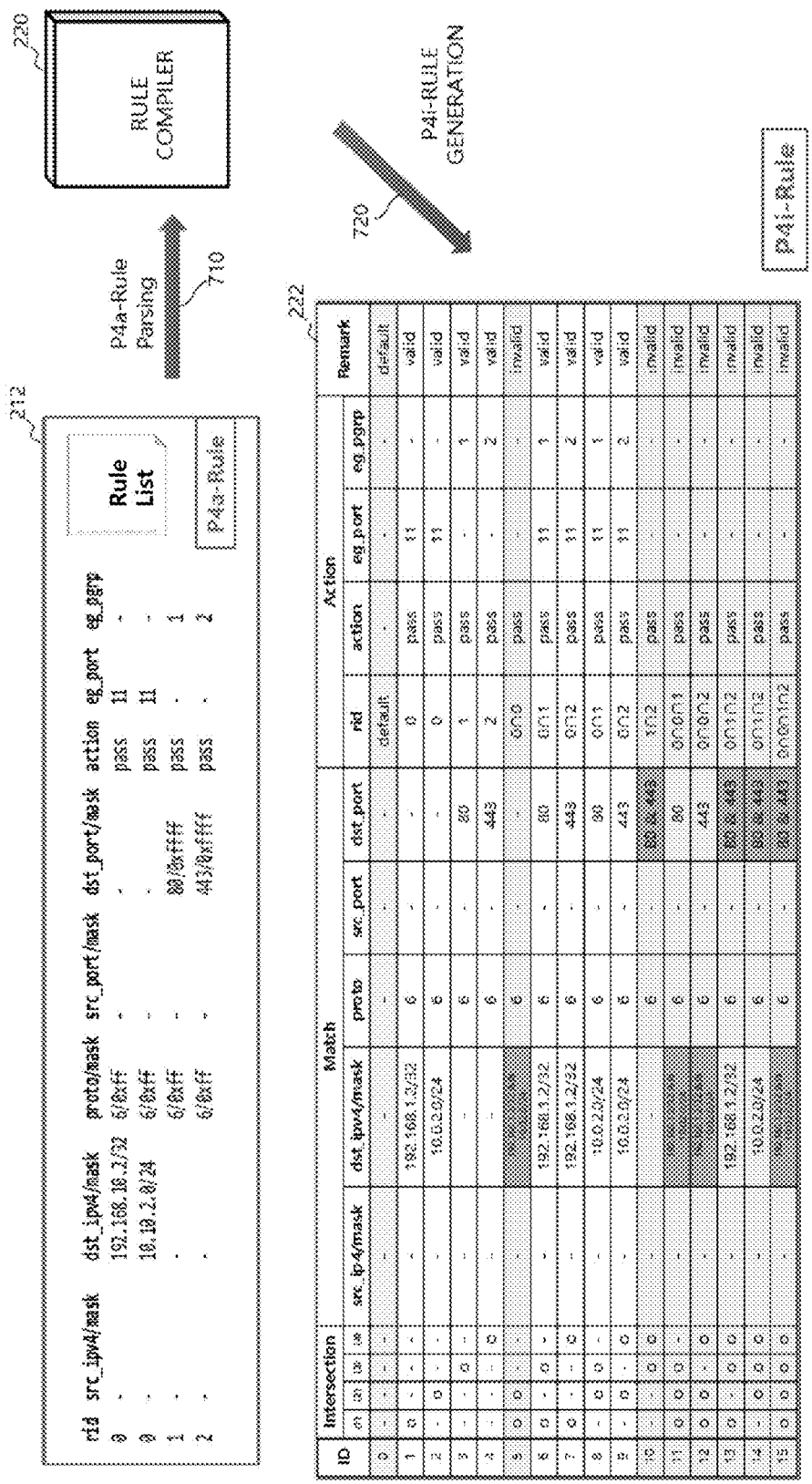
FIG. 7 is a diagram illustrating intersection transformation of a rule compiler according to an embodiment of the present invention.

FIG. 7 is a diagram illustrating intersection transformation of a rule compiler according to an embodiment of the present invention.

Referring to FIGS. 2 and 7, the rule compiler 220 parses (710) a P4a-Rule 212 with N rule entries, calculates the intersection as the overlap between the rule entries in the matching field, and eliminates the intersection, thereby generating a P4i-Rule 222 with $2^N$ rule entries (720).

Figure 8:
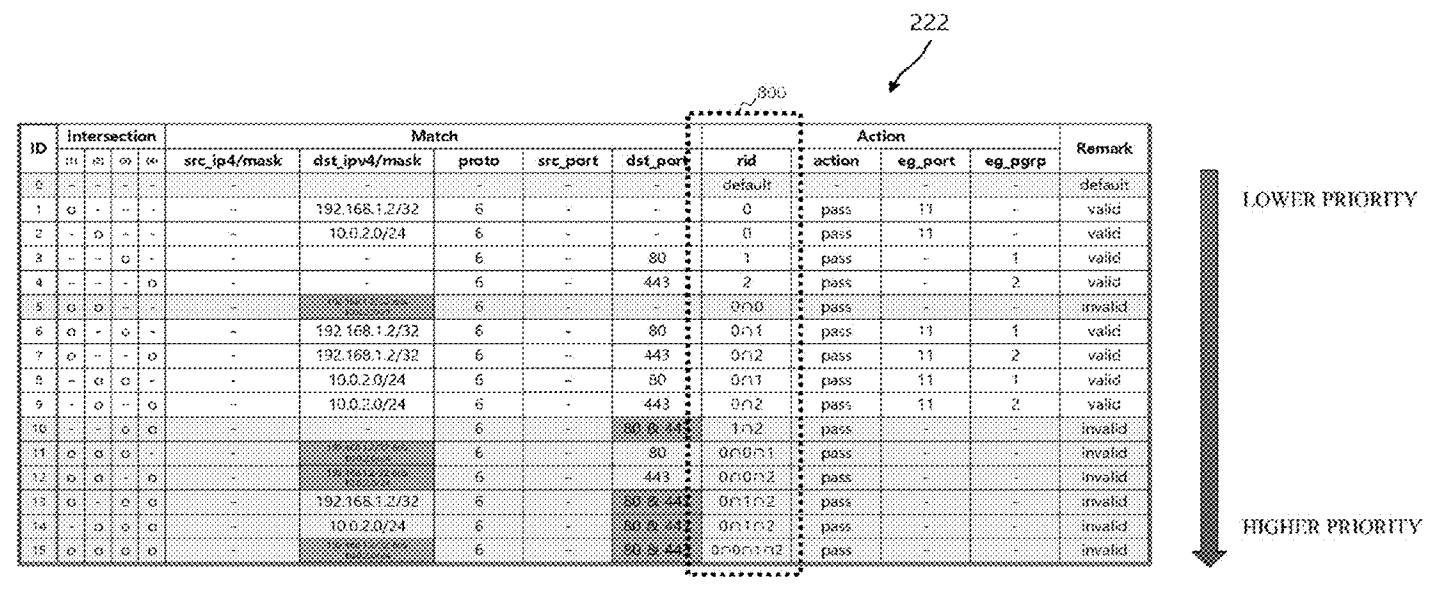

FIG. 8 is a table showing the priority among the rule entries of P4i-Rule generated by the rule compiler according to an embodiment of the present invention.

Referring to FIGS. 2 and 8, the rule compiler allows for overlap among the rule entries of the P4i-Rule 222 obtained by compiling the P4a-Rule 212 using the intersection algorithm, and assign an intersection priority to each rule entry. The more sets included in the intersection, the higher the priority assigned. Accordingly, overlap among rule entries is allowed. The number of sets included in the intersection corresponds to the number of intersection operators. As shown in FIG. 8, the more sets included in the intersection (800), the higher the priority assigned to the corresponding rule entry.

Figure 9:
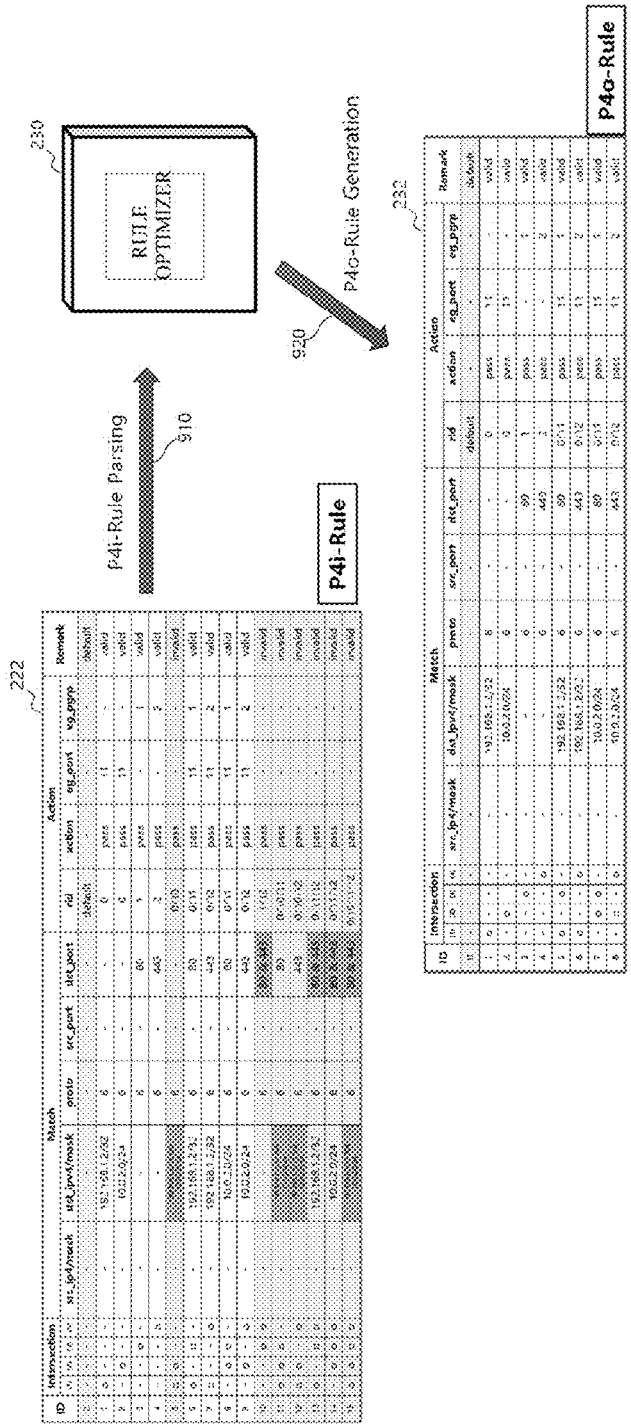
FIG. 9 is a diagram illustrating a rule optimization process according to an embodiment of the present invention.

FIG. 9 is a diagram illustrating a rule optimization process according to an embodiment of the present invention.

Referring to FIGS. 2 and 9, the rule optimizer 230 parses the P4i-Rule 222 (910) and generates an optimized P4o-Rule 232 by deleting invalid rule entries from the P4i-Rule 222 (920).

The invalid rule entries may be rule entries that satisfy an empty rule condition or an equal rule condition. The empty rule condition refers to rule entries with no intersection in the matching field, and the rule optimizer 230 deletes the entries to be compared. The equal rule condition refers to rule entries of the identical matching field, and the rule optimizer 230 deletes the rule with fewer output ports (eg-id) among the rule entries being compared.

Figure 10:
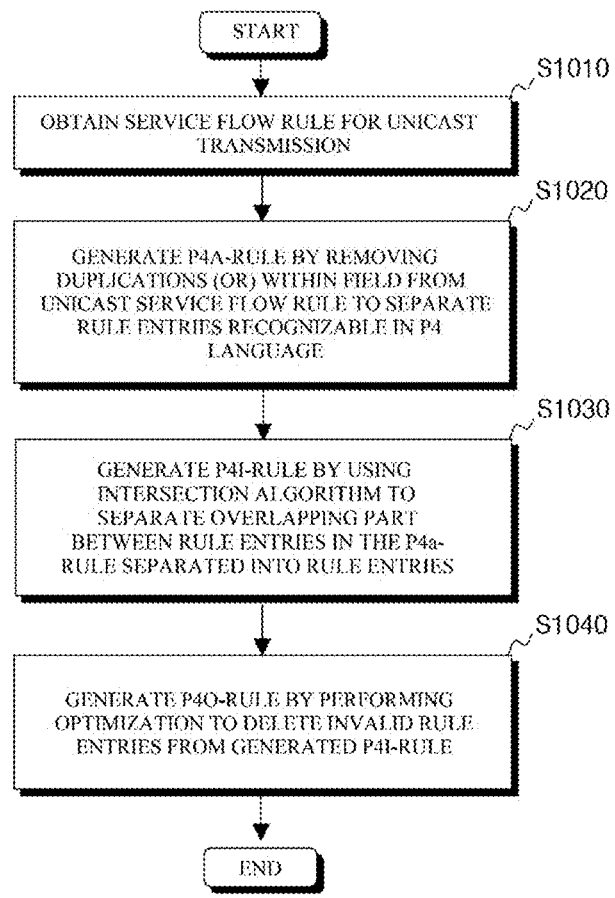
FIG. 10 is a flowchart illustrating a multicast rule transformation method according to an embodiment of the present invention.

FIG. 10 is a flowchart illustrating a multicast rule transformation method according to an embodiment of the present invention.

Referring to FIGS. 2 and 10, the multicast rule transformation apparatus obtains a service flow rule for unicast transmission (S1010).

Subsequently, the multicast rule transformation apparatus 200 generates a P4a-Rule by removing duplications (OR) within the field from the obtained unicast service flow rule to separate rule entries recognizable in the P4 language (S1020).

Then, the multicast rule transformation apparatus 200 uses an intersection algorithm to separate the overlap between rule entries in the separated P4a-Rule, generating a P4i-Rule (S1030).

In the generation of the P4i-Rule (S1030), the multicast rule transformation apparatus 200 may perform a rule-entry intersection operation algorithm on the P4a-Rule according to the type of key field of the service flow rule to calculate the intersection part, and may separate the calculated intersection part.

In the generation of the P4i-Rule (S1030), the multicast rule transformation apparatus 200 may perform a rule-entry intersection operation algorithm on the P4a-Rule with N rule entries to generate a P4i-Rule with a maximum of $2^N$ rule entries. In this case, the number of rule entries may match the total number of multicast output ports.

In the generation of the P4i-Rule (S1030), the multicast rule transformation apparatus 200 allows for overlap among the rule entries of the P4i-Rule obtained by compiling the R4a-Rule using the intersection algorithm, and assign an intersection priority to each rule entry. In this case, the multicast rule conversion device 200 may assign higher priorities to rule entries with a larger number of sets included in the intersection.

Subsequently, the multicast rule transformation apparatus 200 performs optimization by deleting invalid rule entries from the P4i-Rule and generates an optimized P4o-Rule (S1040).

In the generation of the P4o-Rule (S1040), the multicast rule transformation apparatus 200 may parse the P4i-Rule and remove invalid rule entries from the P4i-Rule to generate the optimized P4o-Rule. In this case, the invalid rule entries may be rule entries that satisfy an empty rule condition or an equal rule condition. The empty rule condition refers to rule entries with no intersection in the matching field. The equal rule condition refers to rule entries of the identical matching field.

So far, the multicast rule transformation method according to an embodiment of the present invention has been described in detail. It should be noted that each of the operations described above can be used independently, but multiple operations may be used together as needed.

Figure 11:
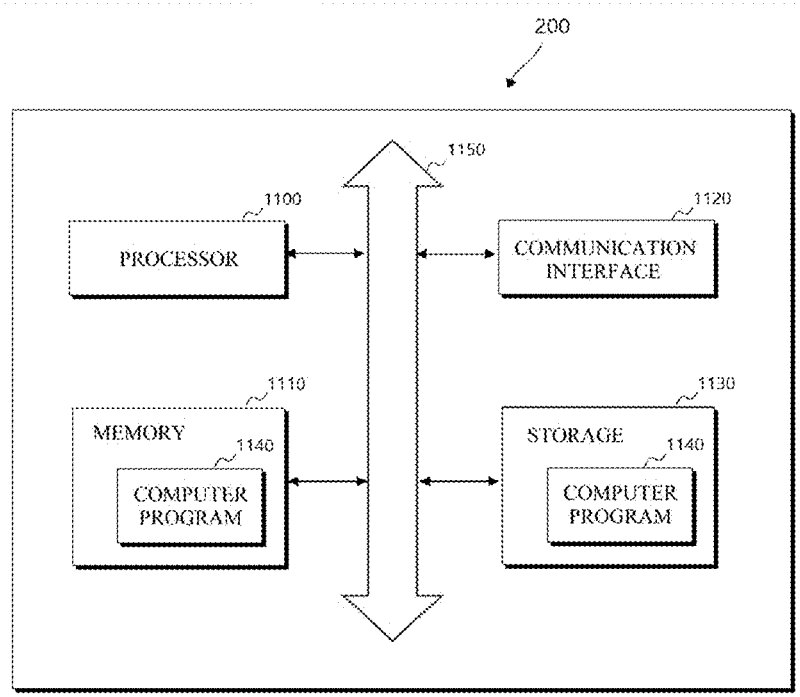
FIG. 11 is a diagram illustrating the hardware configuration of a multicast rule transformation apparatus according to an embodiment of the present invention.

FIG. 11 is a diagram illustrating the hardware configuration of a multicast rule transformation apparatus according to an embodiment of the present invention.

Referring to FIG. 11, a multicast rule transformation apparatus 200 may include at least one processor 1100, memory 1110 configured to load a computer program 1140 executed by the processor 1100, a communication interface 1120, storage 1130 for storing the computer program 1140 executed by the processor 1100, and a system bus 1150.

The processor 1100 controls the overall operation of the multicast rule transformation apparatus 200. The processor 1100 may perform operations for at least one application or program to execute the method/operations according to various embodiments of the present disclosure.

The memory 1110 stores various data, commands, and/or information. The memory 1110 may load one or more computer programs 1140 from the storage 1130 to execute the method/operations according to various embodiments of the present disclosure.

The storage 1130 may temporarily store one or more computer programs 1140. The computer program 1140 may include one or more instructions that implement the method/operations according to various embodiments of the present disclosure.

Once the computer program 1140 is loaded into the memory 1110, the processor 1100 may perform the method/operations according to various embodiments of the present disclosure by executing one or more instructions.

The system bus 1150 provides communication between components of the multicast rule transformation apparatus 200. The communication interface 1120 supports Internet communication for the multicast rule transformation apparatus 200.

According to the multicast rule transformation apparatus and the method thereof of the present invention, a service flow rule for unicast transmission may be transformed into a service flow rule for multicast transmission.

Heretofore, the present invention has been described by focusing on the exemplary embodiments. It can be understood by those skilled in the art to which the present invention pertains that the present invention can be implemented in modified forms without departing from the essential feature of the present invention. Therefore, the disclosed embodiments should be considered as illustrative rather than determinative. The scope of the present invention is defined by the appended claims rather than by the foregoing description, and all differences within the scope of equivalents thereof should be construed as being included in the present invention.

What is claimed is:

1. An apparatus for transforming a service flow rule (SF-Rule) for unicast transmission into a service flow rule for multicast transmission, the apparatus comprising:
   a rule decoder configured to generate a P4-aware service flow rule (hereinafter referred to as "P4a-Rule") by removing duplications (OR) within a field from a service flow rule for unicast transmission to separate rule entries recognizable in the P4 language;
   a rule compiler configured to generate a P4-intersect service flow rule (hereinafter referred to as a "P4i-Rule") by separating an overlapping part between the rule entries in the P4a-Rule, which is separated into the rule entries through the rule decoder, using an intersection algorithm; and a rule optimizer configured to generate a P4-optimized service flow rule (hereinafter referred to as "P4o-Rule") by performing optimization to delete invalid rule entries in the P4i-Rule generated by the rule compiler.

2. The apparatus of claim 1, wherein the rule compiler performs a rule-entry intersection operation algorithm on the p4a-Rule according to a type of key field of a service flow rules to calculate an intersection part, and separates the calculated intersection part.

3. The apparatus of claim 2, wherein, if the type of key field is Subnet Mask field, the rule compiler calculates the intersection part as a subnet mask with a smaller value among subnet masks being compared, and if the type of key field is Bit Mask field, the rule compiler calculates the intersection part as a bit mask with the most bits among bit masks being compared.

4. The apparatus of claim 2, wherein when calculating the intersection part based on whether key fields are identical (exact the same fields), the rule compiler calculates the intersection part as the identical value, and, if the result of the intersection operation is an empty set or an equal set, determines that a corresponding rule is an invalid rule, and the invalid rule is subject to removal by the optimizer.

5. The apparatus of claim 1, wherein the rule compiler performs a rule-entry intersection operation algorithm on the P4a-Rule with N rule entries to generate a P4i-Rule with a maximum of $2^N$ rule entries, and the number of rule entries matches the total number of multicast output ports.

6. The apparatus of claim 1, wherein the rule compiler allows for overlap among the rule entries of the P4a-Rule obtained by compiling the R4a-Rule using the intersection algorithm, assigns an intersection priority to each rule entry, and assigns a higher priority to a rule entry with a larger number of sets included in an intersection.

7. The apparatus of claim 1, wherein the rule optimizer parses the P4i-Rule and removes invalid rule entries from the P4i-Rule to generate the optimized P4o-Rule, the invalid rule entries are rule entries that satisfy an empty rule condition or an equal rule condition, the empty rule condition refers to rule entries with no intersection in a matching field, and the equal rule condition refers to rule entries of the identical matching field.

8. The apparatus of claim 7, wherein, when the equal rule condition is satisfied, the rule optimizer deletes a rule with fewer output ports (eg-id) among rule entries being compared.

9. A method for transforming a service flow rule for unicast transmission into a service flow rule for multicast transmission by using a multicast rule transformation apparatus, the method comprising:
obtaining a service flow rule for unicast transmission;
generating a P4a-Rule by removing duplications (OR) within a field from the obtained service flow rule to separate rule entries recognizable in the P4 language;
generating a P4i-Rule by separating an overlapping part between the rule entries in the P4a-Rule, which is separated into the rule entries, using an intersection algorithm; and
generating a P4o-Rule by performing optimization to delete invalid rule entries in the generated P4i-Rule.

10. The method of claim 9, wherein in the generation of the P4i-Rule, a rule-entry intersection operation algorithm is performed on the P4a-Rule according to the type of key field of the service flow rule to calculate an intersection part, and the calculated intersection part is separated.

11. The method of claim 9, wherein in the generation of the P4i-Rule, a rule-entry intersection operation algorithm is performed on the P4a-Rule with N rule entries to generate a P4i-Rule with a maximum of $2^N$ rule entries, and the number of rule entries matches the total number of multicast output ports.

12. The method of claim 9, wherein in the generation of the P4i-Rule, overlap among the rule entries of the P4i-Rule obtained by compiling the R4a-Rule using the intersection algorithm is allowed, an intersection priority is assigned to each rule entry, and a higher priority is assigned to a rule entry with a larger number of sets included in an intersection.

13. The method of claim 9, wherein in the generation of the P4o-Rule, the P4i-Rule is parsed and invalid rule entries are deleted from the P4i-Rule to generate the optimized P4o-Rule, the invalid rule entries are rule entries that satisfy an empty rule condition or an equal rule condition, the empty rule condition refers to rule entries with no intersection in a matching field, and the equal rule condition refers to rule entries of the identical matching field.

* * * * *